(12) United States Patent
Nakayama et al.

(10) Patent No.: US 8,592,021 B2
(45) Date of Patent: *Nov. 26, 2013

(54) DISK ROLL AND BASE MATERIAL FOR DISK ROLL

(75) Inventors: Masaaki Nakayama, Tokyo (JP); Masatoshi Mitsuta, Tokyo (JP)

(73) Assignee: Nichias Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/801,166

(22) Filed: May 26, 2010

(65) Prior Publication Data

US 2010/0240511 A1    Sep. 23, 2010

Related U.S. Application Data

(63) Continuation of application No. 11/727,447, filed on Mar. 27, 2007, now Pat. No. 7,781,043.

(30) Foreign Application Priority Data

Mar. 31, 2006    (JP) .............................. P. 2006-100490

(51) Int. Cl.
*B32B 3/02*    (2006.01)
*F16C 13/00*   (2006.01)
*D21H 17/16*   (2006.01)

(52) U.S. Cl.
USPC ........... 428/66.6; 428/137; 428/64.1; 501/35; 492/40

(58) Field of Classification Search
USPC .............. 428/64.1, 66.4, 66.6, 137, 353, 848, 428/426, 66.7; 501/36, 53, 98.1, 123, 134, 501/153, 35, 70; 492/40, 50, 59; 51/307; 65/100, 101, 108, 374.3; 422/245.1; 264/40.5

See application file for complete search history.

(56) References Cited

U.S. PATENT DOCUMENTS

| | | | |
|---|---|---|---|
| 2,917,426 A | 12/1959 | Bugosh | |
| 3,116,053 A | 12/1963 | Ericsson et al. | |
| 3,354,031 A | 11/1967 | Kozacik | |
| 3,456,931 A | 7/1969 | Ermec et al. | |
| 3,749,638 A | 7/1973 | Renaud | |
| 3,763,533 A | 10/1973 | Blom et al. | |

(Continued)

FOREIGN PATENT DOCUMENTS

| | | |
|---|---|---|
| DE | 195 37 523 | 4/1997 |
| DE | 101 02 893 A1 | 5/2002 |

(Continued)

OTHER PUBLICATIONS

Translation JP2000-220037, Nichias, Aug. 2000.*

(Continued)

*Primary Examiner* — Kevin M. Bernatz
*Assistant Examiner* — Louis Falasco
(74) *Attorney, Agent, or Firm* — Nixon & Vanderhye P.C.

(57) ABSTRACT

The present invention provides a base material for disk rolls which is a platy molded article for obtaining ring-shaped disks for use in a disk roll comprising a rotating shaft and ring-shaped disks fitted thereon by insertion, whereby the peripheral surface of the disks serves as a conveying surface, the base material comprising inorganic fibers having a crystallization temperature of 800-900° C., a filler, and a clay. Also disclosed is a disk roll which comprises disks cut out of the base material.

5 Claims, 2 Drawing Sheets

(56) References Cited

U.S. PATENT DOCUMENTS

| | | | |
|---|---|---|---|
| 3,852,862 A | 12/1974 | Sukenik | |
| 3,853,525 A | 12/1974 | Gorman | |
| 4,352,230 A | 10/1982 | Sukenik | |
| 4,397,673 A | 8/1983 | Stevens | |
| 4,416,043 A | 11/1983 | Aoki et al. | |
| 4,443,550 A | 4/1984 | Kume et al. | |
| 4,462,456 A | 7/1984 | Kameyama et al. | |
| 4,487,631 A | 12/1984 | Britt et al. | |
| 4,533,581 A * | 8/1985 | Asaumi et al. | 428/64.1 |
| 4,577,675 A | 3/1986 | Ishihara et al. | |
| 5,205,398 A | 4/1993 | Hart et al. | |
| 5,378,219 A | 1/1995 | Hart et al. | |
| 5,506,179 A | 4/1996 | Morishita et al. | |
| 5,709,639 A | 1/1998 | Hart et al. | |
| 5,989,170 A | 11/1999 | Hart et al. | |
| 6,120,661 A | 9/2000 | Hirano et al. | |
| 6,896,646 B2 | 5/2005 | Kaiser et al. | |
| 7,284,328 B2 | 10/2007 | Kaiser | |
| 7,507,194 B2 | 3/2009 | Neubauer et al. | |
| 7,781,043 B2 * | 8/2010 | Nakayama et al. | 428/64.1 |
| 2003/0110708 A1 | 6/2003 | Rosenflanz | |
| 2003/0181302 A1 | 9/2003 | Kaiser et al. | |
| 2004/0007021 A1 | 1/2004 | Igo et al. | |
| 2004/0192526 A1 | 9/2004 | Nakayama et al. | |
| 2004/0220032 A1* | 11/2004 | Nakayama et al. | 65/374.13 |
| 2004/0234436 A1* | 11/2004 | Howorth | 422/245.1 |
| 2005/0113238 A1* | 5/2005 | Wallenberger | 501/35 |
| 2005/0212158 A1* | 9/2005 | Kaiser | 264/40.5 |
| 2006/0094583 A1* | 5/2006 | Freeman et al. | 501/36 |
| 2006/0287185 A1* | 12/2006 | Creux et al. | 428/426 |
| 2008/0120995 A1 | 5/2008 | Neubauer et al. | |

FOREIGN PATENT DOCUMENTS

| | | | |
|---|---|---|---|
| EP | 0 366 028 A2 | 5/1990 | |
| EP | 537966 A1 | 4/1993 | |
| EP | 1 036 294 | 9/2000 | |
| EP | 1 048 625 A1 | 11/2000 | |
| EP | 1 454 888 A2 | 9/2004 | |
| GB | 1017473 | 1/1966 | |
| GB | 2 083 017 A | 3/1982 | |
| JP | 58-156717 | 9/1983 | |
| JP | 59-28771 | 7/1984 | |
| JP | 61-209940 | 9/1986 | |
| JP | 62-263917 | 11/1987 | |
| JP | 64-065037 | 3/1989 | |
| JP | 2-255566 | 10/1990 | |
| JP | 2-289461 | 11/1990 | |
| JP | 3-164460 | 7/1991 | |
| JP | 7-187827 | 7/1995 | |
| JP | 09-301765 | 11/1997 | |
| JP | 11-92215 | 4/1999 | |
| JP | 2000128557 A | 5/2000 | |
| JP | 2000-220037 | * 8/2000 | C03C 13/00 |
| JP | 2002-068777 | 3/2002 | |
| JP | 2003055069 A | 2/2003 | |
| JP | 2003-527278 | 9/2003 | |
| WO | WO 99/28690 | 6/1999 | |

OTHER PUBLICATIONS

Office Action (and English translation) dated Jan. 11, 2011 in Chinese application Serial No. 200710087554.X.
Official Action (and English translation) in JP 2006-100490 mailed Oct. 19, 2010.
Patent Abstract of Japan, vol. 1998, No. 3, Feb. 27, 1998 and JP 09 301765 A (Nichias Corp.), 5 pages.
Translation JP 07-187827; Jul. 1995.
Translation JP 2003-55069; Feb. 2003.
Translation JP09-301765, Nov. 1997.
Office Action and English translation in Korean 10-2007-0031962 dated Jul. 27, 2012.
UNIFRAX Product Information sheet, hap://www.fiberfrax.corn/ 2006.
U.S. Appl. No. 12/612,278.
U.S. Appl. No. 13/067,011.
U.S. Appl. No. 13/111,116.
U.S. Appl. No. 13/067,836.
Office Action in Taiwan application Serial No. 096110996 dated Jan. 25, 2013.

* cited by examiner

DISK ROLL AND BASE MATERIAL FOR DISK ROLL

This application is a continuation application based on application Ser. No. 11/727,447 filed Mar. 27, 2007 now U.S. Pat. No. 7,781,043, which in turn is based on and claims priority to JP 2006-100490 filed 31 Mar. 2006, the entire contents of which is hereby incorporated by reference.

FIELD OF THE INVENTION

The present invention relates to a disk roll which comprises a rotating shaft and ring-shaped disks fitted thereon by insertion, whereby the peripheral surface of the disks serves as a conveying surface. More particularly, the invention relates to a disk roll suitable for use in producing a high-quality glass plate. The invention further relates to a base material for disk rolls which is for use in producing therefrom disks for the disk roll.

BACKGROUND OF THE INVENTION

In the production of a glass plate, a conveying mechanism is necessary for glass plate formation from a molten-state glass or for annealing the glass plate formed. This conveying mechanism generally comprises conveying rolls, and disk rolls are being used as one species of such conveying rolls.

FIG. 1 is a diagrammatic view illustrating a disk roll 10 as an example. This disk roll 10 is produced in the following manner. An aqueous slurry containing inorganic fibers, a filler, a clay as a binder, and other ingredients is formed into a sheet by a papermaking method and dried to form a platy material having a thickness of about several millimeters. Ring-shaped disks are punched out of the resultant dried base material for disk rolls, and these disks 12 are fitted by insertion onto a metallic shaft 11 serving as a rotating shaft. Thus, a roll-form stack is obtained. The whole stack is compressed through flanges 13 disposed respectively on both ends, and these disks 12 in this slightly compressed state are fastened with nuts 15 or the like. In the disk roll 10 thus obtained, the peripheral surface of the disks 12 functions as a conveying surface.

Such disk rolls 10 are mounted in a glass plate production apparatus 100 as shown in FIG. 2, and used for glass plate formation and conveyance. This glass plate production apparatus 100 is an apparatus in which a molten glass 110 is continuously discharged from a melting furnace 101 through a linear slit 102 of the furnace, and this strip-form molten glass 110 discharged is caused to descend and is cooled and hardened during the descent to thereby produce a glass plate. The disk rolls 10 function as a pair of drawing rolls, which hold the strip-form molten glass 110 therebetween and forcedly send it downward. The disk rolls 10 just after the production thereof are constituted of disks 12 obtained by merely shaping the aqueous slurry. When the disk rolls 10 in this state are used for conveyance, the clay is sintered by the heat transferred upon contact with the molten glass 110. The disks 12 thus harden, and strength and wearing resistance are imparted thereto. The hardening proceeds with repetitions of contact with the molten glass 110.

Alumina fibers and aluminosilicate fibers are extensively used as the inorganic fibers from the standpoint of heat resistance. Alumina fibers and aluminosilicate fibers crystallize upon heating or the crystallization thereof proceeds with heating, whereby these fibrous materials increase in hardness. Although alumina fibers and aluminosilicate fibers can contribute to an improvement in wearing resistance through the hardening thereof, neither the alumina fibers nor the aluminosilicate fibers crystallize at the surface temperature of the molten glass 110 (about 800° C.).

A disk roll containing mica particles which are incorporated in order to impart heat resistance and wearing resistance has been proposed (see, for example, patent document 1). However, with the formulations using alumina fibers or aluminosilicate fibers, the contribution of these fibers to wearing resistance is not great as stated above.

Patent Document 1: JP-B-59-28771

SUMMARY OF THE INVENTION

An object of the invention, which has been achieved under those circumstances, is to provide a disk roll which has a well balanced combination of heat resistance, wearing resistance and flexibility, and which is satisfactory in these properties.

Other objects and effects of the invention will become apparent from the following description.

In order to accomplish the object, the invention provides the base material for disk rolls and the disk roll shown below.

(1) A base material for disk rolls which is a platy molded article for obtaining ring-shaped disks for use in a disk roll comprising a rotating shaft and ring-shaped disks fitted thereon by insertion, whereby the peripheral surface of the disks serves as a conveying surface, the base material comprising inorganic fibers having a crystallization temperature of 800-900° C., a filler, and a clay.

(2) The base material for disk rolls according to (1) above, wherein the inorganic fibers are biosoluble fibers.

(3) The base material for disk rolls according to (2) above, wherein the biosoluble fibers are coated with a phosphoric acid salt, a molybdenum compound, a zinc compound, a polyamidine compound, or an ethyleneimine compound.

(4) The base material for disk rolls according to any one of (1) to (3) above wherein the content of the inorganic fibers is 5-40% by mass based on the whole amount of the base material.

(5) A disk roll which comprises a rotating shaft and, fitted thereon by insertion, ring-shaped disks cut out of the base material for disk rolls according to any one of (1) to (4) above, whereby the peripheral surface of the disks serves as a conveying surface.

(6) The disk roll according to (5) above which has a compression deformation of 0.05-0.3 mm when a load of 10 kgf/cm is imposed on the roll surface at 800° C.

In the disk roll of the invention, the inorganic fibers contained in the disks crystallize at the surface temperature of a molten glass. Consequently, upon contact with a molten glass, the inorganic fibers crystallize simultaneously with sintering of the clay to form a surface layer having higher hardness and thereby impart excellent heat resistance and wearing resistance. In addition, due to the heat-insulating properties inherently possessed by the disks, heat transfer to inner parts of the disks during repetitions of contact with a molten glass is inhibited and, hence, the inner parts do not harden excessively and can retain moderate flexibility. Because of this, the disk roll of the invention has a well balanced combination of heat resistance, wearing resistance and flexibility, and has a long life and high performance.

Figure 1:
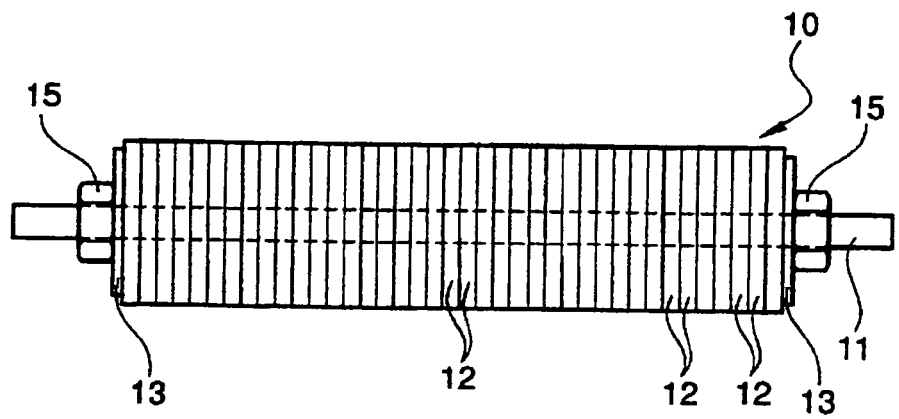
FIG. 1 is a diagrammatic view illustrating one embodiment of the disk roll of the invention.

The reference numerals used in the drawings denote the followings, respectively.
10: Disk roll
11: Metallic shaft
12: Disk
13: Flange
15: Nut
100: Glass plate production apparatus
101: Melting furnace
102: Slit
110: Strip-form molten glass

DETAILED DESCRIPTION OF THE INVENTION

The invention will be explained below in detail.

The base material for disk rolls of the invention is a platy molded article of a mixture of a clay, a filler, and inorganic fibers having a crystallization temperature of 800-900° C. (hereinafter also referred to simply as "inorganic fibers").

As the clay, use can be made of one which, when mixed with water, shows viscosity and plasticity and which has the property of sintering upon heating. With respect to the kind thereof, examples include Kibushi clay, Gairome clay, and fire clay. Of these, Kibushi clay is preferred because it has a high binding effect in sintering and has a low impurity content. Two or more clays can be used in combination according to need.

The clay may be one which has been regulated, through separation/purification, so that the content of components having a particle diameter of 5 µm or larger therein is 30% by mass or lower, preferably 15% by mass or lower, more preferably 10% by mass or lower. With respect to the lower limit thereof, a clay containing entirely no component having a particle diameter of 5 µm or larger is optimal. Such clay particles which are fine and uniform in particle diameter exhibit higher binding ability and tenaciously bind other disk-constituting materials.

Through the separation/purification, impurities also are simultaneously removed. In general, the particle diameters of a clay, which is a natural mineral, can be regulated in some degree by pulverization/classification. However, clay products contain a large amount of impurities and the impurities, in many cases, include ones which do not have susceptibility to sintering, such as, e.g., silica. In disk rolls, sintering and resultant hardening proceed during use as a result of contact with the material being conveyed, such as a molten glass. However, the impurities not having susceptibility to sintering can be a factor which inhibits the hardening function. In addition, the impurities include many hard substances and there is a possibility that the hard substances might mar the material being transferred, in particular, a glass plate. The content of impurities is preferably as close to zero as possible. However, in view of the actual circumstances including labor and cost, the content of impurities is preferably 10% by mass or lower, especially 5% by mass or lower, more preferably 1% by mass or lower, based on the whole clay.

In regulating the particle diameters so as to be small and within the given range as described above and in removing impurities, it is effective to employ wet-process classification as a method of separation/purification. By conducting wet-process classification, not only impurities differing in specific gravity or size can be removed, but also a raw-material clay having smaller particle diameters and a narrower particle size distribution than in dry classification can generally be obtained while utilizing the phenomenon in which sedimentation velocities vary with the particle diameter.

As the filler, use can be made of one which has heat resistance, does not show unnecessary reactivity with other compounding materials, and does not contain hard large particles. Examples thereof include talc, alumina powder, silica powder, highly purified wollastonite, and non-plastic kaolinite. However, particles of a mica or vermiculite are suitable. Micas are known to have high elasticity and be excellent in slip properties, wearing resistance, heat resistance, etc., and are materials which have been industrially utilized from long ago in various fields. In the invention, a mica may be added for the purpose of enabling the disks to conform to the thermal expansion of the shaft. In a disk roll, since the shaft 11 onto which the disks 12 are fitted as shown in FIG. 1 is made of a metal, this shaft 11 thermally expands upon exposure to high temperatures and extends in the axial direction. In this case, since the disks 12 have a lower coefficient of thermal expansion than the metal, the disks 12 cannot conform to the elongation of the shaft 11 and are separated from one another. On the other hand, the mica, which has a layered structure made up of exceedingly thin layers, releases crystal water upon heating to undergo crystal modification. With this crystal modification, the mica tends to expand in the thickness direction for the layers. This expansion in the layer thickness direction enhances the conformability of the disks 12 to the thermal expansion of the shaft 11.

As the mica, use can be made of muscovite ($K_2Al_4(Si_3Al)_2O_{20}(OH)_4$), biotite, phlogopite ($K_2Mg_6(SiAl)_2O_{20}(OH)_4$), paragonite, lepidolite, or a synthetic fluoromica. However, muscovite, which releases crystal water at about 600° C., i.e., a temperature lower than the surface temperature of a molten glass, is preferred from the standpoint of the function of enhancing conformability.

The average particle diameter of the mica may be 5-500 µm, and is preferably 100-300 µm, more preferably 200-300 µm. When the mica has an average particle diameter within that range, it is highly elastic and hence effectively functions as plate springs to store the stress generated by compression with other compounding materials, in particular, the inorganic fibers. Thus, conformability to the thermal expansion of the shaft can be further enhanced.

Vermiculite generally contains crystal water and dehydrates upon exposure to high temperatures. Namely, it functions like a blowing agent. It is therefore preferred to use vermiculite which has been burned beforehand at, e.g., 600-900° C. The average particle diameter of the vermiculite is preferably 5-500 μm as in the mica.

The mica and vermiculite may be used alone or in combination.

The inorganic fibers are not limited as long as they have a crystallization temperature of 800-900° C. Examples thereof include the inorganic fibers described in JP-A-2000-220037, JP-A-2002-68777, JP-A-2003-73926, and JP-A-2003-212596. Specific examples thereof include: inorganic fibers in which the total content of $SiO_2$ and CaO is 85% by mass or higher and which contain 0.5-3.0% by mass MgO and 2.0-8.0% by mass $P_2O_5$ and have a carcinogenicity index (KI value) as determined in accordance with German Hazardous Substances Regulations of 40 or higher; inorganic fibers comprising $SiO_2$, MgO, and $TiO_2$ as essential components; inorganic fibers comprising $SiO_2$, MgO, and manganese oxide as essential components; inorganic fibers comprising 52-72% by mass $SiO_2$, less than 3% by mass $Al_2O_3$, 0-7% by mass MgO, 7.5-9.5% by mass CaO, 0-12% by mass $B_2O_3$, 0-4% by mass BaO, 0-3.5% by mass SrO, 10-20.5% by mass $Na_2O$, 0.5-4.0% by mass $K_2O$, and 0-5% by mass $P_2O_5$; and inorganic fibers comprising 75-80% by mass $SiO_2$, 19-25% by mass CaO+MgO, and 1-3% by mass $Al_2O_3$. Such inorganic fibrous materials may be used alone or as a mixture of two or more thereof. The crystallization temperature of inorganic fibers can be ascertained by examining the fibers with a differential thermal analyzer (DTG-50, manufactured by Shimadzu Corp.) for exothermic peak attributable to crystallization.

Of those inorganic fibrous materials, ones which have a solubility in physiological saline, as determined by the method shown below, of 1% or higher are called "biosoluble fibers" and are especially preferred in the invention.

A method of determining the solubility of inorganic fibers in physiological saline is explained. First, 1 g of a sample prepared by pulverizing the inorganic fibers to a 200-mesh powder and 150 mL of physiological saline are introduced into an Erlenmeyer flask (300 mL). This flask is placed in a 40° C. incubator. Subsequently, the Erlenmeyer flask is continuously shaken horizontally at a rotation speed of 120 rpm for 50 hours. After the shaking, the mixture is filtered, and the resultant filtrate is analyzed by ICP emission spectroscopy to determine the concentrations of silicon, magnesium, calcium, and aluminum elements (mg/L) contained therein. The solubility in physiological saline C (%) is calculated from the concentrations of the elements and from the contents of the elements in the inorganic fibers before the dissolution (% by mass), using the following equation (1). With respect to the element concentrations obtained by the ICP emission spectroscopy, the concentration of silicon element is expressed as $a1$ (mg/L), concentration of magnesium element as $a2$ (mg/L), concentration of calcium element as $a3$ (mg/L), and concentration of aluminum element as $a4$ (mg/L). With respect to the element contents in the inorganic fibers before dissolution, the content of silicon element is expressed as $b1$ (% by mass), content of magnesium element as $b2$ (% by mass), content of calcium element as $b3$ (% by mass), and content of aluminum element as $b4$ (% by mass).

$$C(\%)=\{(\text{filtrate amount}(L))\times(a1+a2+a3+a4)\times100\}/\{(\text{amount of inorganic fibers before dissolution (mg)})\times(b1+b2+b3+b4)/100\} \quad (1)$$

The size of the inorganic fibers is not particularly limited. However, from the standpoint of the strength of the disk roll to be produced, the inorganic fibers preferably are ones having an average fiber diameter of 1-5 μm, preferably 3-5 μm, and a fiber length of 0.5-200 mm, preferably 1-20 mm.

The clay, filler, and inorganic fibers may be mixed in the following proportions. The proportion of the clay is 5-55% by mass, preferably 20-40% by mass, based on the total amount of the base material. The proportion of the filler is 5-60% by mass, preferably 20-55% by mass, based on the total amount of the base material. The proportion of the inorganic fibers is 5-40% by mass, preferably 20-30% by mass, based on the total amount of the base material. When the ingredients are mixed in such proportions, a disk roll retaining a well balanced combination of heat resistance, wearing resistance, and flexibility is obtained.

For producing the base material for disk rolls, use can be made of a method in which an aqueous slurry containing the clay, filler, and inorganic fibers is formed into a plate shape by a papermaking method and this plate is dried. This method is preferred because it is efficient. In this operation, ingredients such as a coagulant aid, organic fibers, and organic binder may be incorporated into the aqueous slurry in a given amount. The coagulant aid, organic fibers, and organic binder each may be known one.

In the case where biosoluble fibers are used as the inorganic fibers, it is preferred that a substance which forms a coating layer, such as, e.g., a phosphoric acid salt, a molybdenum compound, a zinc compound, a polyamidine compound, or an ethyleneimine compound, be incorporated into the aqueous slurry in order to inhibit the fibers from dissolving in the water. The amount of the coating-forming substance to be incorporated is preferably 0.1-10% by mass, more preferably 0.3-6% by mass, based on the sum of the clay, filler, and biosoluble fibers from the standpoint of satisfactorily coating the whole biosoluble fibers.

Examples of the substance for forming a coating layer include inorganic compounds such as phosphoric acid salts, molybdenum compounds, and zinc compounds and organic compounds such as polyamidine compounds and ethyleneimine compounds. Examples of the phosphoric acid salts include aluminum tripolyphosphate, aluminum dihydrogen tripolyphosphate, aluminum metaphosphate, zinc phosphate, and calcium phosphate. Examples of the molybdenum compounds include zinc molybdate, aluminum molybdate, calcium molybdate, calcium phosphomolybdate, and aluminum phosphomolybdate. Examples of the zinc compounds include zinc oxide. Examples of the polyamidine compounds include acrylamide, acrylonitrile, N-vinylacrylamidine hydrochloride, N-vinylacrylamide, vinylamine hydrochloride, and N-vinylformamide copolymers. Examples of the ethyleneimine compounds include aminoethylene and dimethyleneimine.

The thickness of the base material for disk rolls can be suitably regulated, and may be the same as those heretofore in use. In general, the thickness thereof is 2-10 mm.

The invention further provides a disk roll employing disks cut out of the base material for disk rolls described above. The disk roll may have the constitution shown in FIG. 1, which can be obtained in the following manner. Ring-shaped disks 12 are punched out of the base material for disk rolls described above. These disks 12 are fitted onto a shaft 11 made of a metal (e.g., iron) by insertion to obtain a roll-form stack. The whole stack is compressed through flanges 13 respectively on both ends, and these disks 12 in this slightly compressed state are fastened with nuts 15 or the like. Thereafter, the periphery of the disks 12 is ground so as to result in a given roll diameter to thereby obtain a disk roll 10.

In the disk roll 10 of the invention, the inorganic fibers in a surface layer part crystallize simultaneously with the sintering of the clay upon contact with a molten glass. As a result, the surface layer part comes to have a higher hardness and better wearing resistance than those in which clay sintering only has occurred. In addition, the surface layer comes to have enhanced heat-insulating properties and, hence, the heat of the molten glass is less apt to be transferred to inner parts, whereby moderate flexibility is retained. Specifically, the disk roll has a compression deformation of 0.05-0.3 mm when a load of 10 kgf/cm is imposed on the roll surface at 800° C.

EXAMPLES

The invention will be explained below in greater detail with reference to Examples and Comparative Examples, but the invention should not be construed as being limited to the Examples.

Examples 1 to 6 and Comparative Examples 1 to 4

Aqueous slurries containing the raw materials shown in Table 1 were prepared. Each slurry was formed into sheets by an ordinary papermaking method to produce a disk-roll base material in sheets which had dimensions of 100 mm×100 mm×6 mm on a dry basis. The inorganic fibers A are aluminosilicate fibers ($SiO_2$:$Al_2O_3$=(54-55% by weight):(45-55% by weight)), while the inorganic fibers B are biosoluble fibers comprising 75-80% by mass $SiO_2$, 19-25% by mass CaO+ MgO, and 1-3% by mass $Al_2O_3$ and having a crystallization temperature of 860° C. and a solubility in physiological saline at 40° C. of 5.9%.

Figure 3:
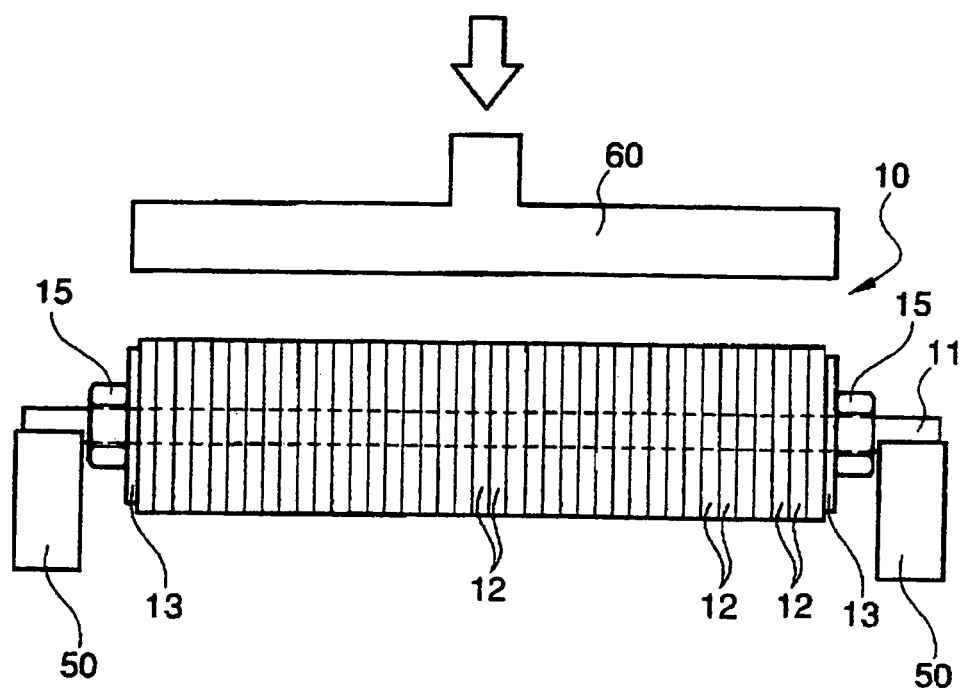
FIG. 3 is a diagrammatic view illustrating the constitution of the apparatus used in the Examples for measuring compression deformation.

Disks having an outer diameter of 80 mm and an inner diameter of 30 mm were punched out of each of the base materials for disk rolls, and fitted onto an iron shaft having a diameter of 30 mm and a length of 100 mm by insertion. Both ends of each disk stack were fixed with nuts to produce a cylindrical disk roll which had the constitution shown in FIG. 1 and in which the disks had a compressed density of 1.2 g/cm³. This disk roll was held in an 800° C. heating oven for 180 minutes, taken out of the heating furnace, and then placed on trestles 50 so that both ends of the shaft 11 were supported on the trestles 50 as shown in FIG. 3. A load of 10 kgf/cm was imposed on the conveying surface, which was constituted of the disks 12, with an indentator 60 at a rate of 1 mm/min to measure the resultant compression deformation. The results obtained are also shown in Table 1.

Disk rolls produced in the same manner were evaluated for wearing resistance in the following manner. Each disk roll was held in an 800° C. heating furnace for 180 minutes. Thereafter, the roll was rotated at 10 rpm and rubbed against a friction material made of SUS. The amount by which the radius of the roll had decreased due to the rubbing was measured as an index to wearing resistance.

Figure 2:
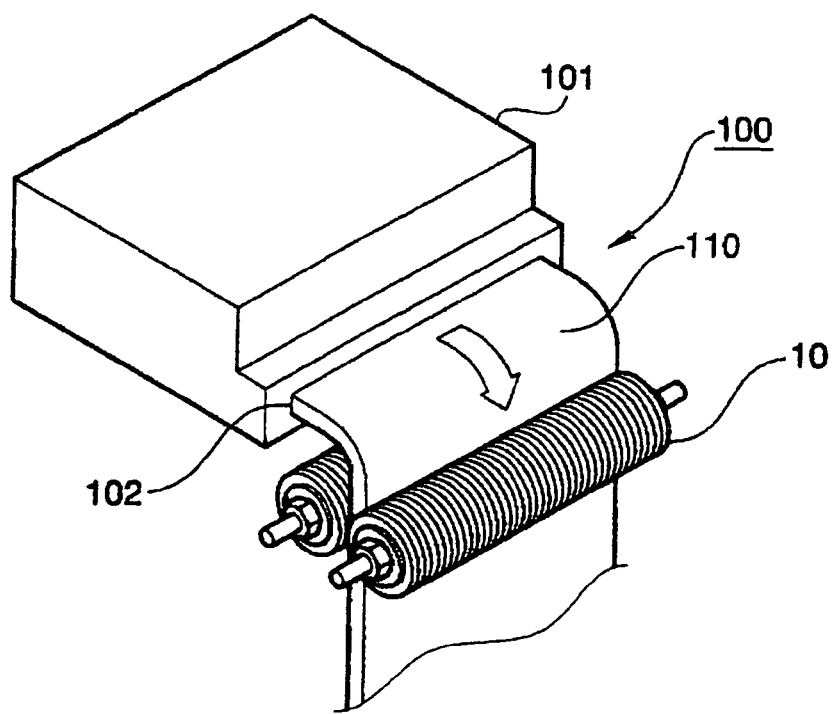
FIG. 2 is a diagrammatic view illustrating one example of applications (glass plate production apparatus) in which the disk rolls shown in FIG. 1 are used.

Furthermore, disk rolls produced in the same manner were mounted in a glass plate production apparatus having the constitution shown in FIG. 2. This apparatus was used to actually produce a glass plate. The surfaces of the glass plate obtained were visually examined for mars.

The results of those examinations are also shown in Table 1.

TABLE 1

| | Example 1 | Example 2 | Example 3 | Example 4 | Example 5 | Example 6 | Example 7 | Comp. Ex. 1 | Comp. Ex. 2 | Comp. Ex. 3 | Comp. Ex. 4 |
|---|---|---|---|---|---|---|---|---|---|---|---|
| Kibushi clay | 20 | 20 | 20 | 20 | 30 | 50 | 20 | 20 | 30 | 50 | 30 |
| Inorganic fibers A | | | | | | | | 20 | 20 | 10 | 30 |
| Inorganic fibers B | 40 | 40 | 30 | 20 | 20 | 10 | 36.5 | | | | |
| Aluminum tripolyphosphate | | | | | | | 3.5 | | | | |
| Mica | | 25 | 35 | 45 | 35 | 25 | 25 | 45 | 35 | 25 | 25 |
| Vermiculite | 25 | | | | | | | | | | |
| Organic fibers | 10 | 10 | 10 | 10 | 10 | 10 | 10 | 10 | 10 | 10 | 10 |
| Organic binder | 5 | 5 | 5 | 5 | 5 | 5 | 5 | 5 | 5 | 5 | 5 |
| Compressed density (g/cm³) | 1.2 | 1.2 | 1.2 | 1.2 | 1.2 | 1.2 | 1.2 | 1.2 | 1.2 | 1.2 | 1.2 |
| Compression deformation (mm) | 0.22 | 0.24 | 0.18 | 0.10 | 0.12 | 0.07 | 0.20 | 0.10 | 0.16 | 0.05 | 0.20 |
| Number of mars in glass surfaces (per m²) | 2 | 0 | 0 | 0 | 0 | 2 | 0 | 4 | 4 | 10 | 2 |
| Wearing resistance (mm) | 2.0 | 2.5 | 3.0 | 3.5 | 3.5 | 4.0 | 2.0 | 8.0 | 9.5 | 12.0 | 8.0 |
| Comprehensive evaluation | excellent | excellent | excellent | excellent | excellent | good | excellent | poor | poor | poor | poor |

Note)
Each ingredient amount is in % by mass.

Table 1 shows the following. By incorporating the inorganic fibers having a crystallization temperature of 800-900° C., disk rolls can be obtained which have practically satisfactory heat resistance and wearing resistance and have moderate flexibility which prevents the disk rolls from marring the glass surfaces.

While the present invention has been described in detail and with reference to specific embodiments thereof, it will be apparent to one skilled in the art that various changes and modifications can be made therein without departing from the spirit and scope thereof.

This application is based on Japanese Patent Application No. 2006-100490 filed Mar. 31, 2006, and the contents thereof are herein incorporated by reference.

What is claimed is:

1. A disk roll which comprises a shaft and, fitted thereon by insertion, ring-shaped disks cut out of a base material comprising 5-40% by mass based on a total amount of the base material of biosoluble inorganic fibers having a crystallization temperature of 800-900° C. and a solubility in physiological saline of at least 1%, a filler, and a sinterable clay in an amount of 5 to 55% by mass, whereby a peripheral surface of the disks serves as a conveying surface and the disk roll has a compression deformation of 0.05-0.3 mm when a load of 10 kgf/cm is imposed on a disk roll surface at 800° C., wherein the inorganic fiber contains 75 to 80% by mass of $SiO_2$, 19 to 25% by mass of CaO+MgO and 1 to 3% by mass of $Al_2O_3$.

2. The disk roll according to claim 1, wherein the sinterable clay binder has particles having a diameter of 5 μm or larger.

3. The disk roll according to claim 1, wherein a coating-forming substance is applied to the inorganic fibers in the base material in an amount of 0.1 to 10% by mass based on a sum of the clay, filler, and inorganic fibers.

4. The disk roll according to claim 1, wherein the filler is contained in an amount of 5 to 60% by mass based on the whole (total) amount of the base material.

5. The disk roll according to claim 1, wherein the inorganic fiber contains $SiO_2$, CaO, MgO and $Al_2O_3$.

* * * * *